United States Patent
Jin et al.

(10) Patent No.: US 11,879,991 B2
(45) Date of Patent: Jan. 23, 2024

(54) DEVICE AND METHOD FOR CONTROLLING RADAR SENSOR

(71) Applicant: HL Klemove Corp., Pyeongtaek (KR)

(72) Inventors: Ho Young Jin, Yongin (KR); Han Byul Lee, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 313 days.

(21) Appl. No.: 17/308,999

(22) Filed: May 6, 2021

(65) Prior Publication Data

US 2021/0349182 A1    Nov. 11, 2021

(30) Foreign Application Priority Data

May 8, 2020    (KR) .................. 10-2020-0054932

(51) Int. Cl.
| | | |
|---|---|---|
| G01S 7/40 | (2006.01) | |
| G01S 13/87 | (2006.01) | |
| G01S 13/931 | (2020.01) | |
| G01S 13/06 | (2006.01) | |

(52) U.S. Cl.
CPC ............ G01S 7/4021 (2013.01); G01S 13/06 (2013.01); G01S 13/878 (2013.01); G01S 13/931 (2013.01)

(58) Field of Classification Search
CPC ...... G01S 13/06; G01S 13/878; G01S 13/931; G01S 7/4021; G01S 7/403; G01S 7/4091
See application file for complete search history.

(56) References Cited

U.S. PATENT DOCUMENTS

| | | | |
|---|---|---|---|
| 2020/0209853 A1* | 7/2020 | Leach | G01S 13/86 |
| 2021/0080562 A1* | 3/2021 | Chabaud | G01S 13/931 |
| 2021/0195112 A1* | 6/2021 | Verghese | G06V 20/56 |
| 2021/0339710 A1* | 11/2021 | Adams | B08B 3/02 |

* cited by examiner

*Primary Examiner* — Timothy X Pham
(74) *Attorney, Agent, or Firm* — Harvest IP Law, LLP

(57) ABSTRACT

The disclosure relates to a device and method for controlling radar sensors. According to an embodiment, a device for controlling a radar sensor comprises a receiver receiving first detection target information from a first radar sensor and receiving second detection target information from a second radar sensor spaced apart from the first radar sensor by a predetermined distance, a determiner determining whether the second detection target information is present in a similarity target monitoring area set to include the first detection target information, if the first detection target information is received, and a controller detecting whether the first radar sensor and the second radar sensor are misaligned using the first detection target information and the second detection target information if the similarity target monitoring area includes the first detection target information and the second detection target information.

18 Claims, 9 Drawing Sheets

DEVICE AND METHOD FOR CONTROLLING RADAR SENSOR

CROSS-REFERENCE TO RELATED APPLICATION

This application claims priority from Korean Patent Application No. 10-2020-0054932, filed on May 8, 2020, which is hereby incorporated by reference for all purposes as if fully set forth herein.

BACKGROUND

Field

The disclosure relates to a device and method for controlling radar sensors, and more particularly, to a radar sensor control device and method capable of determining whether a radar sensor is misaligned.

Description of Related Art

A vehicle is equipped with various sensors and electronic devices for user convenience. In particular, there is ongoing vigorous research efforts at the advanced driver assistance system (ADAS) for drivers' convenience.

Example ADASs using sensors include adaptive cruise control systems and an inter-vehicle distance warning systems. The adaptive cruise control system automatically controls the throttle valve, brake, and transmission of the vehicle based on the position and distance of the preceding vehicle detected by the radar sensor installed in the front of the vehicle to perform appropriate acceleration and deceleration, thereby keeping an appropriate distance from the preceding vehicle. The inter-vehicle distance warning system emits a radar pulse forwards and receives the pulse reflected by a reflector (e.g., the reflector in the taillight of the vehicle) of the preceding vehicle and measures the inter-vehicle distance based on the time difference from the light emission to reception, thereby keeping a proper distance from the preceding vehicle.

In use of the above-described systems, the misalignment of the radar sensor causes erroneous detection of a target on a side lane rather than the target ahead or behind. To drive the inter-vehicle distance warning system, the radar sensor needs to be mounted to accurately capture the preceding vehicle. An error of about 0.8 degrees in adjusting the angle of the transmission/reception direction of the radar sensor results in an error of 1.4 m about 100 m ahead in distance. Particularly for vehicles adopting the automatic emergency brake system, it may lead to sudden braking due to a vehicle traveling on a side lane or false detection of a vehicle approaching from a side lane, putting the vehicle at the risk of a serious accident.

As the demand for vehicle radar systems increases, misalignment of the radar sensor is a critical issue to be addressed to ensure sensor reliability.

BRIEF SUMMARY

According to the disclosure, there is provided a device and method for controlling a radar sensor to determine whether the radar sensor is misaligned by setting a similarity monitoring area.

According to an embodiment, there is provided a device for controlling a radar sensor, comprising a receiver receiving first detection target information from a first radar sensor and receiving second detection target information from a second radar sensor spaced apart from the first radar sensor by a predetermined distance, a determiner determining whether the second detection target information is present in a similarity target monitoring area set to include the first detection target information, if the first detection target information is received, and a controller detecting whether the first radar sensor and the second radar sensor are misaligned using the first detection target information and the second detection target information if the similarity target monitoring area includes the first detection target information and the second detection target information.

According to an embodiment, there is provided a method for controlling a radar sensor, comprising receiving first detection target information from a first radar sensor and receiving second detection target information from a second radar sensor spaced apart from the first radar sensor by a predetermined distance, determining whether the second detection target information is present in a similarity target monitoring area set to include the first detection target information, if the first detection target information is received, and detecting whether the first radar sensor and the second radar sensor are misaligned using the first detection target information and the second detection target information if the similarity target monitoring area includes the first detection target information and the second detection target information.

According to the disclosure, the radar sensor control device may determine whether moving detection targets detected by two radar sensors (e.g., the first and second radar sensors) are similar and detect whether the first radar sensor and the second radar sensor are misaligned via each detected parameter.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
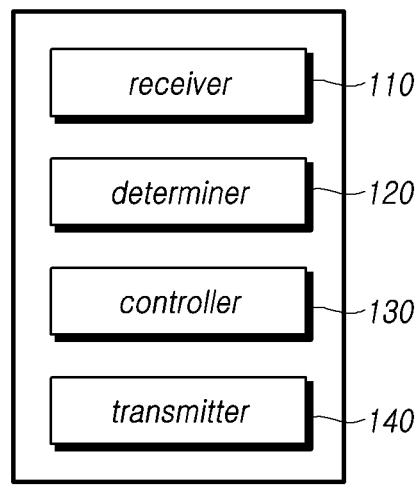
FIG. 1 is a block diagram illustrating a radar sensor control device according to an embodiment of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear.

The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

A radar sensor control device 10 according to an embodiment is described below with reference to FIG. 1.

FIG. 1 is a block diagram illustrating a radar sensor control device 10 according to an embodiment of the disclosure.

Referring to FIG. 1, according to an embodiment, a radar sensor control device 10 may include a receiver 110, a determiner 120, a controller 130, and a transmitter 140.

The radar sensor control device 10 may receive first detection target information 220 from a first radar sensor 21, receive second detection target information 230 from a second radar sensor 22 spaced apart from the first radar sensor 21 by a predetermined distance and, upon receiving the first detection target information 220, detecting whether the first radar sensor 21 and the second radar sensor 22 are misaligned using the first detection target information 220 and the second detection target information 230 if a similarity target monitoring area 210 includes the first detection target information 220 and the second detection target information 230.

The receiver 110 may receive the first detection target information 220 from the first radar sensor 21 and receive the second detection target information 230 from the second radar sensor 22 spaced apart from the first radar sensor 21 by a predetermined distance.

In this disclosure, at least two radar sensors may be used. For example, the radar sensors may include one or more of a front radar sensor mounted on the front of the vehicle, a rear radar sensor mounted on the rear of the vehicle, and a side or side/rear radar sensor mounted on each side of the vehicle, and at least two radar sensors may be mounted in each direction. The radar sensors or radar system may analyze the transmission signal and reception signal to process data, thereby detecting information for the detection target. To that end, the radar sensors or radar system may include an electronic control unit (ECU) or a processor. Data transmission or signal communication from the radar sensor to the ECU may use a communication link, such as a suitable vehicle network bus.

The first radar sensor 21 and the second radar sensor 22 may detect the detection target 30 and detect the first detection target information 220 and the second detection target information 230. The first detection target information 220 and the second detection target information 230 each may include at least one of a reflection power parameter for the detection target 30, a reflection area parameter, a relative distance parameter of the detection target and the host vehicle 20, a relative speed parameter of the detection target 30 and the host vehicle 20, or an angle of the detection target 30 with respect to the host vehicle 20.

FIGS. 2 to 5 are views illustrating a similarity target monitoring area 210 according to an embodiment.

Figure 2:
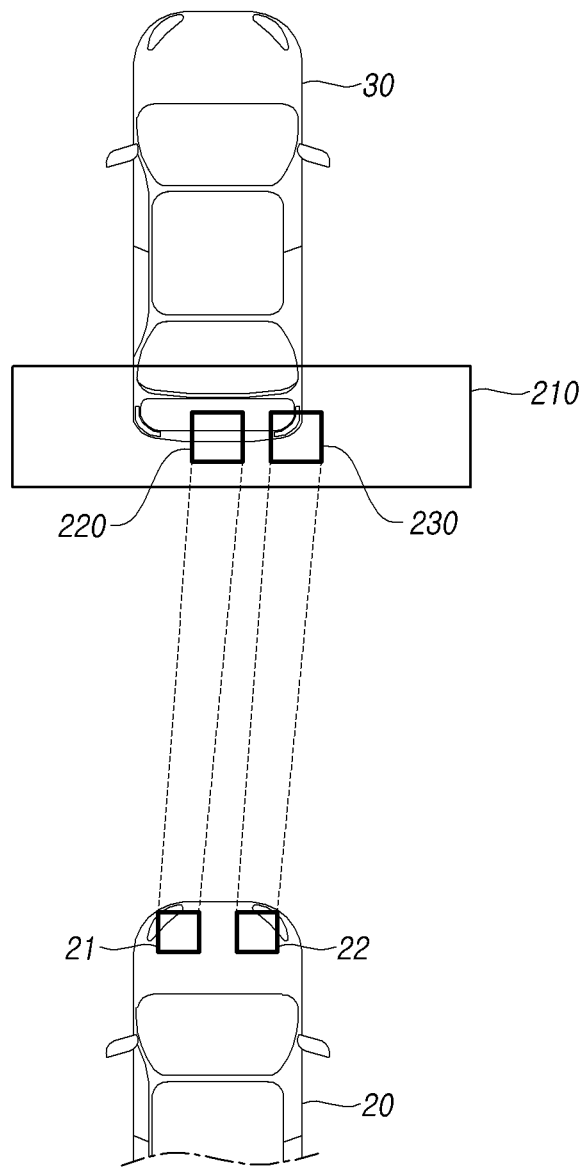
FIGS. 2, 3, 4, and 5 are views illustrating a similarity target monitoring area according to an embodiment.

Referring to FIG. 2, the similarity target monitoring area 210 may include the first detection target information 220, and the determiner 120 may determine whether the second detection target information 230 is present in the similarity target monitoring area 210. Alternatively, the similarity target monitoring area 210 may include the second detection target information 230, and the determiner 120 may determine whether the first detection target information 220 is present in the similarity target monitoring area 210.

The first detection target information 220 may be information obtained by the first radar sensor 21 detecting the detection target 30. The first detection target information 220 may be obtained based on received information, such as the area of reflection for the detection target 30 and the strength of reflection by the detection target 30. The second detection target information 230 may be information obtained by the second radar sensor 22 detecting the detection target 30. The second radar sensor 22 may be spaced apart from the first radar sensor 21 by a predetermined distance. The first detection target information illustrated in FIG. 2 is merely an example and may be implemented in the form of a polygon, a circle, or an ellipse.

Upon receiving the first detection target information 220, the determiner 120 may determine whether the second detection target information 230 is present in the similarity target monitoring area 210 which includes the first detection target information 220.

The similarity target monitoring area 210 may be set by receiving a preset area from the outside and may be set by the determiner 120 based on the first detection target information 220 and the second detection target information 230.

Figure 3:
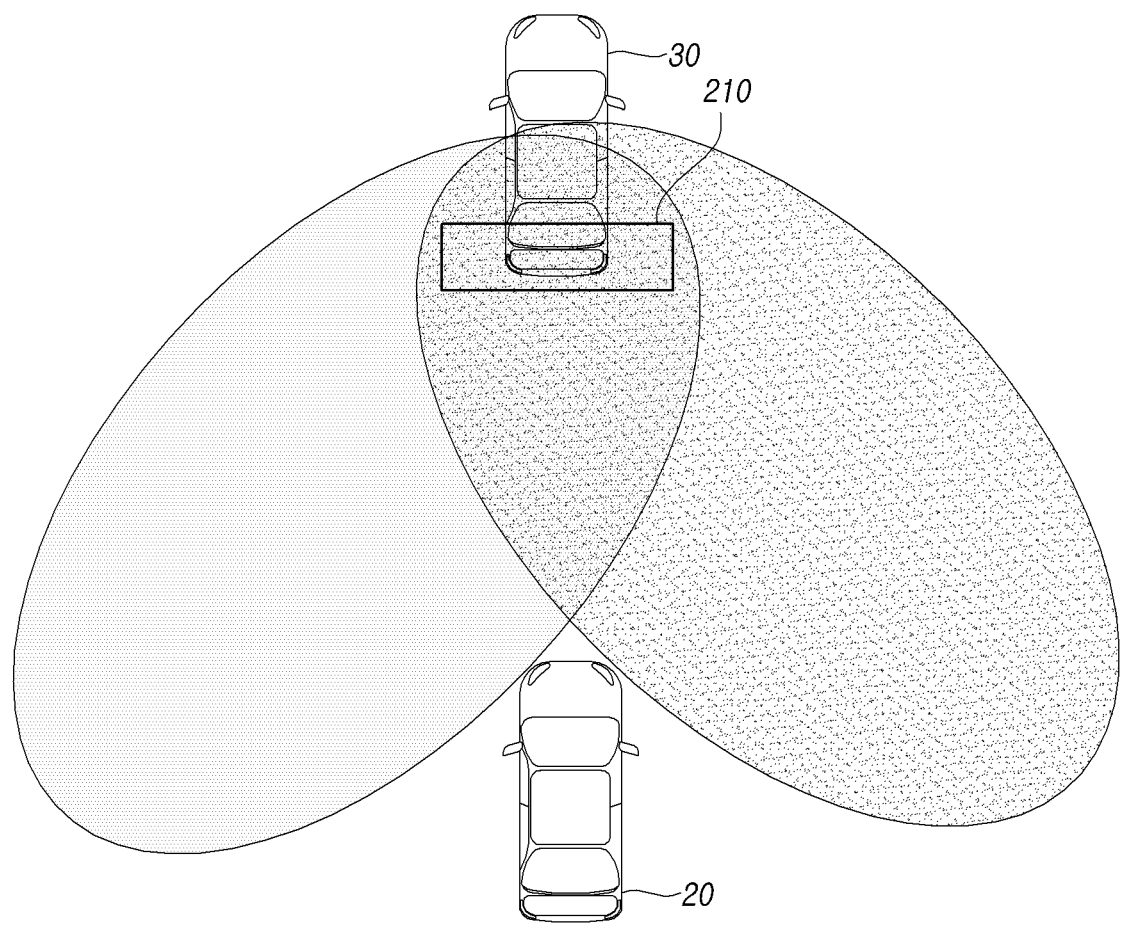

Referring to FIG. 3, the similarity target monitoring area 210 may be set within a range in which the detection range of the first radar sensor 21 overlaps the detection range of the second radar sensor 22. Specifically, the similarity target monitoring area 210 may be set to fall within the overlapping range between the detection ranges of the first radar sensor 21 and the second radar sensor 22 so as to determine whether the first detection target information 220 is identical to the second detection target information 230. If the second detection target information 230 is detected as falling outside the similarity target monitoring area 210, the controller 130 may stop detecting a misalignment of the first radar sensor 21 and the second radar sensor 22.

Figure 4:
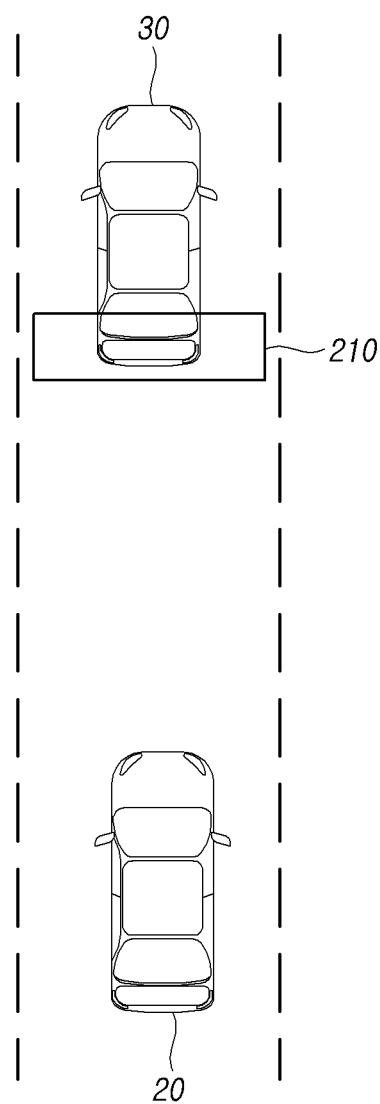

Referring to FIG. 4, if the detection target 30 detected by the first detection target information 220 is a moving object, the similarity target monitoring area 210 may be set based on the lane on which the detection target 30 is located. Specifically, the determiner 120 may set the similarity target monitoring area 210 including the first detection target information 220 and determine whether the detection target 30 is a moving object based on, e.g., the reflection power parameter for the detection target 30, reflection area parameter, relative distance parameter of the detection target 30 and the host vehicle 20, relative speed parameter of the detection target 30 and host vehicle 20, and angle of the detection target 30 with respect to the host vehicle 20. If the detection target 30 is determined to be a vehicle based on the first detection target information 220, the determiner 120 may set the lane on which the detection target 30 is traveling as the similarity target monitoring area 210.

Figure 5:
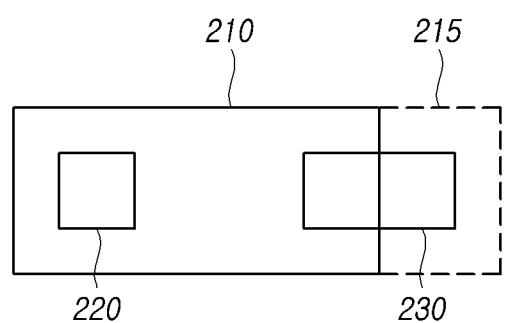

Referring to FIG. 5, if a portion of a threshold point or more of the second detection target information 230 falls within the similarity target monitoring area 210, the determiner 120 may determine that the second detection target information 230 is present in the similarity target monitoring area 210. Specifically, if a predetermined portion of the second detection target information 230 is included in the similarity target monitoring area 210, and the portion of the threshold point or more of the second detection target information 230 is included in the predetermined portion, the determiner 120 may determine that the second detection target information 230 is included in the similarity target monitoring area 210. The threshold point may be 50% of the area of the second detection target information 230 included in the similarity target monitoring area 210. According to an embodiment, upon determining that the second detection target information 230 is included in the similarity target monitoring area 210, the determiner 120 may set a new similarity target monitoring area 215 that may include the whole second detection target information 230.

The above-described similarity target monitoring area 210 is not limited to a rectangle, but may be expressed in a polygonal, elliptical, or circular shape, and is not limited to a specific shape as long as it may include a predetermined area.

As described above, the radar sensor control device 10 may detect a moving object and set therearound as the similarity target monitoring area 210, thereby more accurately detecting whether or not there is a misalignment between the two radar sensors.

If the first detection target information 220 and the second detection target information 230 are included in the similarity target monitoring area 210, the controller 130 may detect whether the first radar sensor 21 and the second radar sensor 22 are misaligned using the first detection target information 220 and the second detection target information 230.

The controller 130 may detect whether the first radar sensor 21 and the second radar sensor 22 are misaligned according to a result of determining whether the detection target 30 detected by each of the first detection target information 220 and the second detection target information 230, which are included in the similarity target monitoring area 210, is for the same object.

Figure 6:
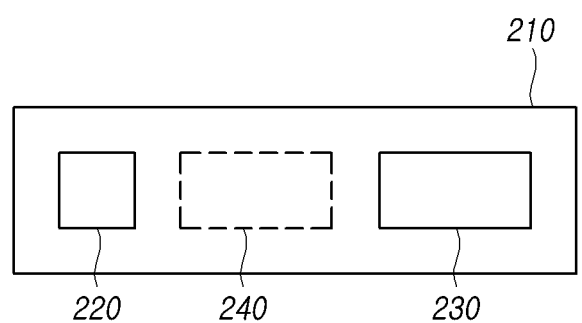
FIG. 6 is a view illustrating determining whether information for the same object detected by a radar sensor is identical to information for the same object detected by target image information according to an embodiment.

FIG. 6 is a view illustrating determining whether information for the same object detected by a radar sensor is identical to information for the same object detected by target image information according to an embodiment.

Referring to FIG. 6, upon determining that the detection target detected by each of the first detection target information 220 and the second detection target information 230 is for the same object and that information for the same object obtained by the first detection target information 220 and the second detection target information 230 is identical to the information for the same object detected by target image information as a result of comparison therebetween, the controller 130 may detect whether the first radar sensor 21 and the second radar sensor 22 are misaligned. To this end, the receiving unit 110 may further receive the detection target image information 240 from an image sensor.

As described above, the radar sensor control device 10 may ensure accuracy of detection as to whether the first radar sensor 21 and the second radar sensor 22 are misaligned by performing the determination of sameness for the same object based on the target image information from the image sensor.

If the detection target image information 240 is present in the similarity target monitoring area 210, the controller 130 may determine whether the first detection target information 220 and the second detection target information 230 are identical to the detection target image.

The controller 130 may perform comparison as to similarity for each of one or more parameters included in the first detection target information 220 and the second detection target information 230, derive a result of the similarity determination, and upon determining that the detected target is for the same object according to the result of the similarity determination, determine whether the first radar sensor 21 and the second radar sensor 22 are misaligned.

For example, the controller 130 may perform comparison on the reflection power parameter, reflection area parameter, and relative distance parameter of the detection target and the host vehicle 20 for the detection target 30 of the first detection target information 220 and the second detection target information 230 and, if each parameter falls within a preset error range, the controller 130 may determine that the detection targets of the first detection target information 220 and the second detection target information 230 are for the same object. As another example, if a majority of the parameters compared for the first detection target information 220 and the second detection target information 230 fall within a preset error range, the controller 130 may determine that the detection targets of the first detection target information 220 and the second detection target information 230 are for the same object.

The controller 130 may apply a preset weight to each of one or more parameters included in the first detection target information 220 and the second detection target information 230, compare them for similarity, and derive a result of the similarity determination.

For example, the controller 130 may perform comparison on the reflection power parameter, reflection area parameter, and relative distance parameter of the detection target 30 and the host vehicle 20 for the detection target 30 of the first detection target information 220 and the second detection target information 230 and, in a case where the reflection power parameter and reflection area parameter for the detection target 30 exceed the error range while the relative speed parameter between the detection target 30 and the host vehicle 20 falls within the error range, if the relative speed parameter weight between the detection target 30 and the host vehicle 20 has been applied, the controller 130 may determine that the detection targets 30 of the first detection target information 220 and the second detection target information 230 are for the same object.

The controller 130 may determine whether the first detection target information 220 and the second detection target information 230 are similar according to an error range of the weight-applied parameter. In a case where weights have been applied to multiple parameters, if a majority of weight-applied parameters fall within the error range as a result of comparison of the parameters of the first detection target information 220 and the second detection target information 230, the controller 130 may determine that the detection targets 30 of the first detection target information 220 and the second detection target information 230 are for the same object.

The controller 130 may perform comparison on each parameters for the detection targets 30 of the first detection target information 220 and the second detection target information 230 and determine whether it falls within the error range and, if it falls within the error range, produces 1 for the corresponding parameter and, if falling outside the error range, produces −1. If the value obtained after comparison is done on all the parameters is not less than a predetermined value, the controller 130 may determine that the detection targets of the first detection target information 220 and the second detection target information 230 are for the same object. The controller 130 may perform comparison on each parameter, apply a preset weight to the obtained value, and if the value obtained after comparison is complete on all the parameters is a predetermined value or more, determine that the detection targets of the first detection target information 220 and the second detection target information 230 are for the same object.

As described above, the radar sensor control device 10 may reflect the environmental factors according to the ambient environment of the sensors by applying a weight to each parameter, thereby more accurately determining whether the detection targets 30 detected by the first detection target information 220 and the second detection target information 230 are identical.

Figure 7:
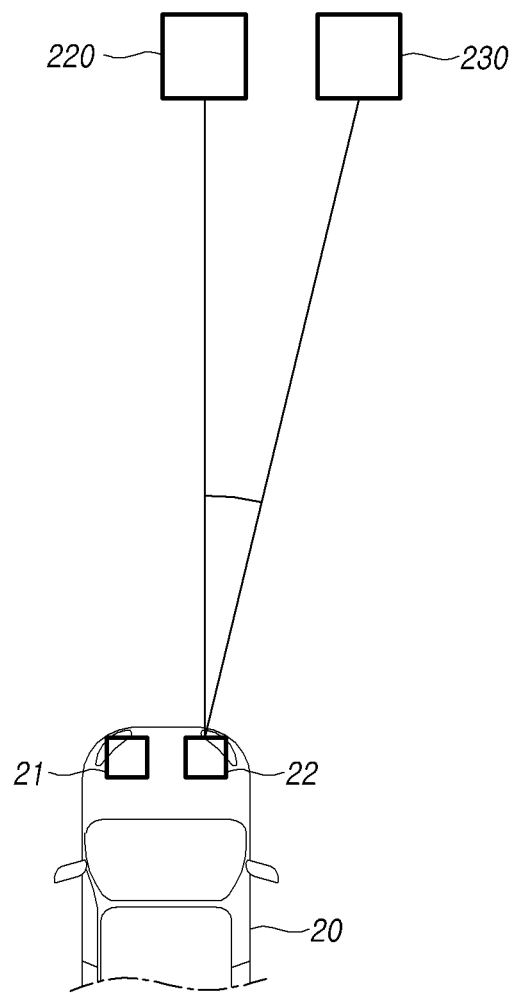
FIG. 7 is a view illustrating determining a misalignment according to an embodiment.

FIG. 7 is a view illustrating determining a misalignment according to an embodiment.

Referring to FIG. 7, if the angle between the straight line connecting the second radar sensor 22 and the first detection target information 220 and the straight line connecting the second radar sensor 22 and the second detection target information 230 is a predetermined angle or more, the controller 130 may determine that the first radar sensor 21 and the second radar sensor 22 are misaligned. The above-described angle may represent the degree of misalignment of the first radar sensor 21 and the second radar sensor 22. The straight line connecting the second radar sensor 22 and the first detection target information 220 preferably connects the center of the second radar sensor 22 and the center of the first detection target information 220. Whether the first radar sensor 21 and the second radar sensor 22 are misaligned may be detected by the angle between the first radar sensor 21, the first detection target information 220, and the second detection target information 230, as well as by the angle formed with respect to the second radar sensor 22.

If the first detection target information 220 and the second detection target information 230 are spaced apart from each other by a predetermined interval or more, the controller 130 may determine that the first radar sensor 21 and the second radar sensor 22 are misaligned.

If the sum of the angle between the straight line connecting the first radar sensor 21 and the detection target image information 240 and the straight line connecting the first radar sensor 21 and the first detection target information 220 and the angle between the straight line connecting the second radar sensor 22 and the detection target image information 240 and the straight line connecting the second radar sensor 22 and the second detection target information 230 is a predetermined angle or more, the controller 130 may determine that the first radar sensor 21 and the second radar sensor 22 are misaligned.

The transmitter 140 may transmit information for the misalignment to an output device provided in the host vehicle 20. The output device may include an audio, navigation, or display.

According to the disclosure, the radar sensor control device 10 may be implemented as an electronic control unit (ECU). The ECU may include at least one or more of one or more processors, a memory, a storage unit, a user interface input unit, or a user interface output unit which may communicate with one another via a bus. The ECU may also include a network interface for accessing a network. The processor may be a central processing unit (CPU) or semiconductor device that executes processing instructions stored in the memory and/or the storage unit. The memory and the storage unit may include various types of volatile/non-volatile storage media. For example, the memory may include a read only memory (ROM) and a random access memory (RAM).

Described below is a method for controlling sensors using the radar sensor control device 10 capable of performing all of the above-described operations or functions.

Figure 8:
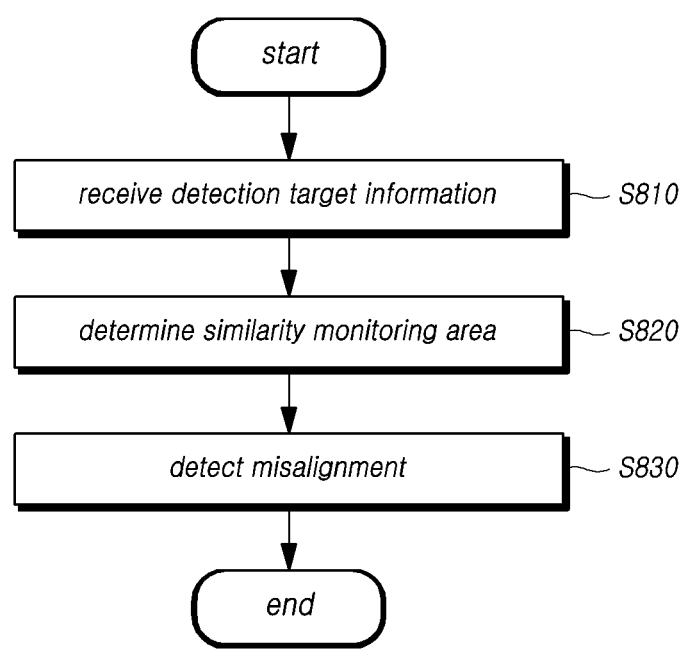
FIG. 8 is a flowchart illustrating a method for controlling a radar sensor according to an embodiment.

FIG. 8 is a flowchart illustrating a method for controlling a radar sensor according to an embodiment.

Referring to FIG. 8, a method for controlling a radar sensor may include receiving first detection target information 220 from a first radar sensor 21 and receiving second detection target information 230 from a second radar sensor 22 spaced apart from the first radar sensor 21 by a predetermined distance (S810); determining whether the second detection target information 230 is present in a similarity target monitoring area 210 set to include the first detection target information 220, if the first detection target information 220 is received (S820); and detecting whether the first radar sensor 21 and the second radar sensor 22 are misaligned using the first detection target information 220 and the second detection target information 230 if the similarity target monitoring area 210 includes the first detection target information 220 and the second detection target information 230 (S830). The first detection target information 220 and the second detection target information 230 each may include at least one of a reflection power parameter for the detection target 30, a reflection area parameter, a relative distance parameter of the detection target and the host vehicle 20, a relative speed parameter of the detection target 30 and the host vehicle 20, or an angle of the detection target 30 with respect to the host vehicle 20.

Detecting misalignment (S830) may detect whether the first radar sensor 21 and the second radar sensor 22 are misaligned according to a result of determining whether detection target 30 detected by each of the first detection target information 220 and the second detection target information 230, which are included in the similarity target monitoring area 210, is for the same object.

Detecting misalignment (S830) may perform comparison as to similarity for each of one or more parameters included in the first detection target information 220 and the second detection target information 230, derive a result of the similarity determination, and upon determining that the detected target is for the same object according to the result of the similarity determination, determine whether the first radar sensor 21 and the second radar sensor 22 are misaligned.

Detecting misalignment (S830) may apply a preset weight to each of one or more parameters included in the first detection target information 220 and the second detection target information 230, compare them for similarity, and derive a result of the similarity determination.

If the angle between the straight line connecting the second radar sensor 22 and the first detection target information 220 and the straight line connecting the second radar sensor 22 and the second detection target information 230 is a predetermined angle or more, detecting misalignment (S830) may determine that the first radar sensor 21 and the second radar sensor 22 are misaligned.

Detecting misalignment (S830) may further receive detection target image information 240 from an image sensor and, upon determining that the detection target detected by each of the first detection target information 220 and the second detection target information 230 is for the same object and that information for the same object obtained by the first detection target information 220 and the second detection target information 230 is identical to the information for the same object detected by target image information as a result of comparison therebetween, the controller 240 may detect whether the first radar sensor 21 and the second radar sensor 22 are misaligned.

The similarity target monitoring area 210 may be set within a range in which the detection range of the first radar sensor 21 overlaps the detection range of the second radar sensor 22.

The similarity target monitoring area 210 may be set with respect to the lane on which the detection target 30 is located if the detection target 30 detected by the first detection target information 220 is a moving object, and determining the similarity target monitoring area 210 (S820) may set the lane on which the detection target 30 is traveling as the similarity target monitoring area 210 if it is determined based on the first detection target information 220 that the detection target 30 is a vehicle.

If a portion of a threshold point or more of the second detection target information 230 falls within the similarity target monitoring area 210, determining the similarity target monitoring area 210 (S820) may determine that the second detection target information 230 is present in the similarity target monitoring area 210.

Figure 9:
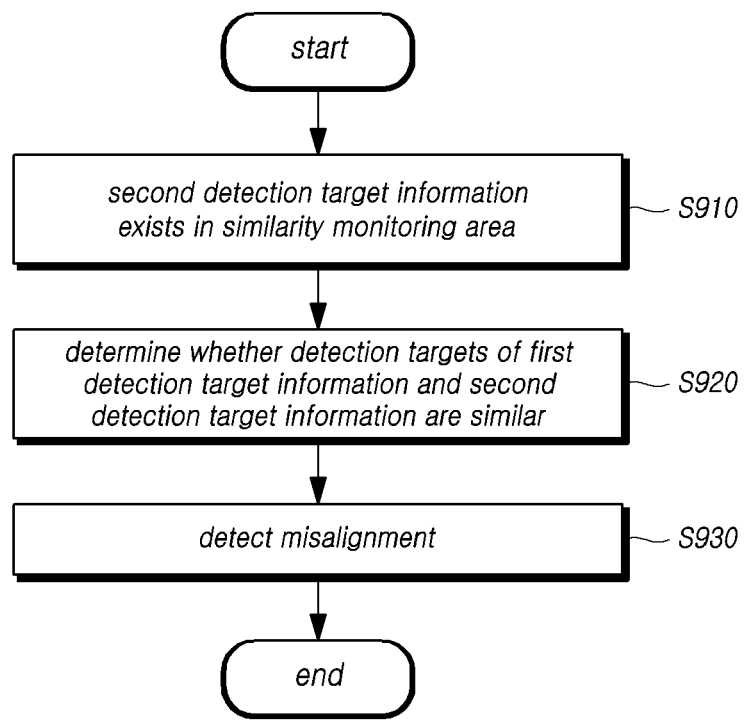
FIG. 9 is a flowchart more specifically illustrating step S830 according to an embodiment.

FIG. 9 is a flowchart more specifically illustrating step S830 according to an embodiment.

Referring to FIG. 9, the radar sensor control device 10 may determine whether the second detection target information 230 is present in the similarity target monitoring area (S910). If a portion of a threshold point or more of the second detection target information 230 falls within the similarity target monitoring area 210, the radar sensor control device 10 may determine that the second detection target information 230 is present in the similarity target monitoring area 210.

The radar sensor control device 10 may determine whether the detection target 30 detected by each of the first detection target information 220 and the second detection target information 230 is for the same object (S920). The radar sensor control device 10 may determine whether they are similar by performing comparison on the reflection power parameter for the detection target 30, reflection area parameter, relative distance parameter of the detection target and the host vehicle 20, relative speed parameter of the detection target 30 and the host vehicle 20, and angle of the detection target 30 with respect to the host vehicle 20, for the detection target 30, which are included in each of the first detection target information 220 and the second detection target information 230. The radar sensor control device 10 may apply a weight to each parameter and determine whether the detection target 30 detected by each of the first detection target information 220 and the second detection target information 230 is for the same or similar.

Upon determining that the detection target 30 detected by each of the first detection target information 220 and the second detection target information 230 is for the same object, the radar sensor control device 10 may detect misalignment information for the first radar sensor 21 and the second radar sensor 22 (S930). The radar sensor control device 10 may compare the parameters included in the first detection target information 220 and the second detection target information 230 to detect the misalignment information. If the angle between the straight line connecting the second radar sensor 22 and the first detection target information 220 and the straight line connecting the second radar sensor 22 and the second detection target information 230 is a predetermined angle or more, the radar sensor control device 10 may determine that the first radar sensor 21 and the second radar sensor 22 are misaligned.

The radar sensor control device 10 may transmit information about the detection of the misalignment to an output device to warn the user of the result of the misalignment detection.

As described above, according to the disclosure, the radar sensor control device 10 determines whether the detection targets detected by two radar sensors are similar and determine whether the first radar sensor and the second radar sensor are misaligned via each detected parameter.

The technology of providing a device and method for controlling radar sensors may be implemented as an application or in the form of program instructions executable through various computer components, which may then be recorded in a computer-readable recording medium. The computer-readable medium may include programming commands, data files, or data structures, alone or in combinations thereof.

The programming commands recorded in the computer-readable medium may be specially designed and configured for the disclosure or may be known and available to one of ordinary skill in the computer software industry.

Examples of the computer readable recording medium may include, but is not limited to, magnetic media, such as hard disks, floppy disks or magnetic tapes, optical media, such as CD-ROMs or DVDs, magneto-optical media, such as floptical disks, memories, such as ROMs, RAMS, or flash memories, or other hardware devices specially configured to retain and execute programming commands.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A device for controlling a radar sensor, comprising:
a receiver receiving first detection target information from a first radar sensor and receiving second detection target information from a second radar sensor spaced apart from the first radar sensor by a predetermined distance;
a determiner determining whether the second detection target information is present in a similarity target monitoring area set to include the first detection target information, if the first detection target information is received; and
a controller detecting whether the first radar sensor and the second radar sensor are misaligned using the first detection target information and the second detection target information if the similarity target monitoring area includes the first detection target information and the second detection target information,
wherein the receiver receives further detection target image information from an image sensor, and wherein if is determined that a detection target detected by each of the first detection target information and the second detection target information is for the same object, and if it is determined that information for the same object detected by the first detection target information and the second detection target information is identical to information for the same object detected by the detection target image information as a result of comparison therebetween, the controller detects whether the first radar sensor and the second radar sensor are misaligned.

2. The device of claim 1, wherein each of the first detection target information and the second detection target information includes at least one of a reflection power parameter for ,:the detection target, a reflection area parameter, a relative distance parameter of the detection target and a host vehicle, a relative speed parameter of the detection target and the host vehicle, or an angle of the detection target with respect to the host vehicle.

3. The device of claim 2, wherein the controller detects whether the first radar sensor and the second radar sensor are misaligned according to a result of determining whether the detection target detected by each of the first detection target information and the second detection target information included in the similarity target monitoring area is for the same object.

4. The device of claim 3, wherein the controller performs comparison on similarity for each of one or more parameters included in the first detection target information and the second detection target information and derives a result of similarity determination, and
detects whether the first radar sensor and the second radar sensor are misaligned if it is determined as the result of similarity determination that the detection target is for the same object.

5. The device of claim 4, wherein the controller applies a preset weight to each of one or more parameters included in the first detection target information and the second detection target information, performs the comparison on the similarity, and derives the result of similarity determination.

6. The device of claim 3, wherein the controller determines that the first radar sensor and the second radar sensor are misaligned if an angle between a straight line connecting the second radar sensor and the first detection target information and a straight line connecting the second radar sensor and the second detection target information is a predetermined angle or more.

7. The device of claim 1, wherein the similarity target monitoring area is set within an overlapping range between a detection range of the first radar sensor and a detection range of the second radar sensor.

8. The device of claim 1, wherein the similarity target monitoring area is set with respect to a lane where the detection target is located, if the detection target detected by the first detection target information is a moving object.

9. The device of claim 1, wherein the determiner determines that the second detection target information is present in the similarity target monitoring area if a portion of a threshold point or more of the second detection target information is included in the similarity target monitoring area.

10. A method for controlling a radar sensor, comprising:
receiving first detection target information from a first radar sensor and receiving second detection target information from a second radar sensor spaced apart from the first radar sensor by a predetermined distance;
determining whether the second detection target information is present in a similarity target monitoring area set to include the first detection target information, if the first detection target information is received; and
detecting whether the first radar sensor and the second radar sensor are misaligned using the first detection target information and the second detection target information if the similarity target monitoring area includes the first detection target information and the second detection target information,
wherein detecting whether the first radar sensor and the second radar sensor are misaligned includes:
further receiving detection target image information from an image sensor, and if it is determined that a detection target detected by each of the first detection target information and the second detection target information is for the same object, and if it is determined that information for the same oject detected by the first detection target information and the second detected target information is identical to information for the same object detected by the detection target image information as a result of comparison therebetween, detecting whether the first radar sensor and the second radar sensor are misaligned.

11. The method of claim 10, wherein each of the first detection target information and the second detection target information includes at least one of a reflection power parameter for the detection target, a reflection area parameter, a relative distance parameter of the detection target and a host vehicle, a relative speed parameter of the detection target and the host vehicle, or an angle of the detection target with respect to the host vehicle.

12. The method of claim 11, wherein detecting whether the first radar sensor and the second radar sensor are misaligned includes detecting whether the first radar sensor and the second radar sensor are misaligned according to a result of determining whether the detection target detected by each of the first detection target information and the second detection target information included in the similarity target monitoring area is for the same object.

13. The method of claim 12, wherein detecting whether the first radar sensor and the second radar sensor are misaligned includes:

performing comparison on similarity for each of one or more parameters included in the first detection target information and the second detection target information and derives a result of similarity determination; and determining whether the first radar sensor and the second radar sensor are misaligned if it is determined as the result of similarity determination that the detection target is for the same object.

14. The method of claim 13, wherein detecting whether the first radar sensor and the second radar sensor are misaligned includes applying a preset weight to each of one or more parameters included in the first detection target information and the second detection target information, performing the comparison on the similarity, and deriving the result of similarity determination.

15. The method of claim 12, wherein detecting whether the first radar sensor and the second radar sensor are misaligned includes determining that the first radar sensor and the second radar sensor are misaligned if an angle between a straight line connecting the second radar sensor and the first detection target information and a straight line connecting the second radar sensor and the second detection target information is a predetermined angle or more.

16. The method of claim 10, wherein the similarity target monitoring area is set within an overlapping range between a detection range of the first radar sensor and a detection range of the second radar sensor.

17. The method of claim 10, wherein the similarity target monitoring area is set with respect to a lane where the detection target is located, if the detection target detected by the first detection target information is a moving object.

18. The method of claim 10, wherein determining whether the second detection target information is present in a similarity target monitoring area includes determining that the second detection target information is present in the similarity target monitoring area if a portion of a threshold point or more of the second detection target information is included in the similarity target monitoring area.

* * * * *